United States Patent [19]
Forzelias
[11] 4,368,586
[45] Jan. 18, 1983

[54] TENSIONING AND ATTACHMENT MEANS FOR DISPLAY STANDS AND SIMILAR DEVICES

[76] Inventor: Tage N. Forzelias, Villa Brunemo, 186 00 Vallentuna, Sweden

[21] Appl. No.: 165,904

[22] Filed: Jul. 3, 1980

[51] Int. Cl.³ ...................... G09F 17/00; F16M 11/00; B65H 59/10; A47B 47/00

[52] U.S. Cl. ........................................ 40/604; 40/606; 40/13; 248/409; 248/211; 248/411; 248/125; 188/67; 74/531; 211/192; 211/190

[58] Field of Search ................. 40/603, 604, 606, 610, 40/597, 605, 608, 13, 14, 601, 152, 152.1, 152.2, 153, 154, 155, 156, 157; 248/414, 411, 412, 125, 188.5; 403/330, 373, 374; 188/67; 74/531, 502, 503; 254/29; 211/207, 190, 192

[56] References Cited

U.S. PATENT DOCUMENTS

| | | | |
|---|---|---|---|
| 437,480 | 9/1890 | Chase | 40/607 |
| 1,112,732 | 10/1914 | Uhl | 248/409 |
| 1,460,610 | 7/1923 | Sebree et al. | 40/13 |
| 1,750,273 | 3/1930 | Krauth | 248/211 |
| 3,449,847 | 6/1969 | Howell | 40/601 |
| 3,537,201 | 11/1970 | Huey et al. | 40/604 |
| 3,557,479 | 1/1971 | Allison et al. | 40/610 |
| 3,924,344 | 12/1975 | Davis | 40/597 |

*Primary Examiner*—Robert Peshock
*Assistant Examiner*—Michael J. Foycik, Jr.
*Attorney, Agent, or Firm*—William A. Drucker

[57] ABSTRACT

A tensioning and attachment device comprises a bracket displaceably mounted in relation to a bar or a tube and a tensioning arm is pivotally connected to the bracket and comprises a handle portion and also two lugs, which act against the envelope surface of the bar or tube. These lugs are so shaped that upon actuation of the tensioning arm they firstly bring about displacement of the bracket in relation to the bar or tube, and in the end or final position they fix the bracket to the bar or tube. Preferably, the device is combined with a stand structure such as a display stand, and the foot or base of the stand may have resilient members in the shape of rubber blocks.

3 Claims, 3 Drawing Figures

TENSIONING AND ATTACHMENT MEANS FOR DISPLAY STANDS AND SIMILAR DEVICES

BACKGROUND OF THE INVENTION

The present invention relates to a tensioning and attachment device which is intended for use preferably, but not exclusively, in display stands.

A problem arising in such display stands, which include a stand carrying a transparent plastic pocket into which replaceable displays, posters or the like may be inserted, lies in keeping said plastic pocket in a stretched condition in the position of use. To accomplish this object, various devices have been proposed but they have been complicated and difficult to handle.

OBJECTS OF THE INVENTION

Thus, one object of the present invention is to provide a tensioning and attachment device which is simple as to the structure thereof and is also easy to handle, and which does not need springs and similar members, and which may be applied inter alia to display stands.

Another object of the invention in connection with display stands is to provide a display stand that can withstand strong winds without being knocked around and maintains its function as a display device.

SUMMARY OF THE INVENTION

To accomplish these and other objects, the invention provides a tensioning and attachment means to co-operate with a tube or a bar having a substantially circular section, comprising a bracket carried displaceably on the tube or the bar, and a tensioning arm pivotally mounted to said bracket, said arm including a handle portion and an abutment portion, said abutment portion having two laterally spaced legs at a spacing which substantially corresponds to the diameter of the tube or bar the pivotal journalling point of the arm on the bracket being selected such that said legs, upon swinging of the tensioning arm from an idle to an operative position, engage the outer surface of the tube or bar with a successively increasing force and said swinging movement, due to a grip obtained between the abutment portion and the tube, causing displacement of the bracket along the tube or the bar and resulting in an increasingly stronger grip between the tensioning arm and the bar or tube.

BRIEF DESCRIPTION OF THE DRAWINGS

The accompanying drawings show an embodiment of the invention by way of example.

In the drawings.

DESCRIPTION OF THE PREFERRED EMBODIMENT

Figure 1:
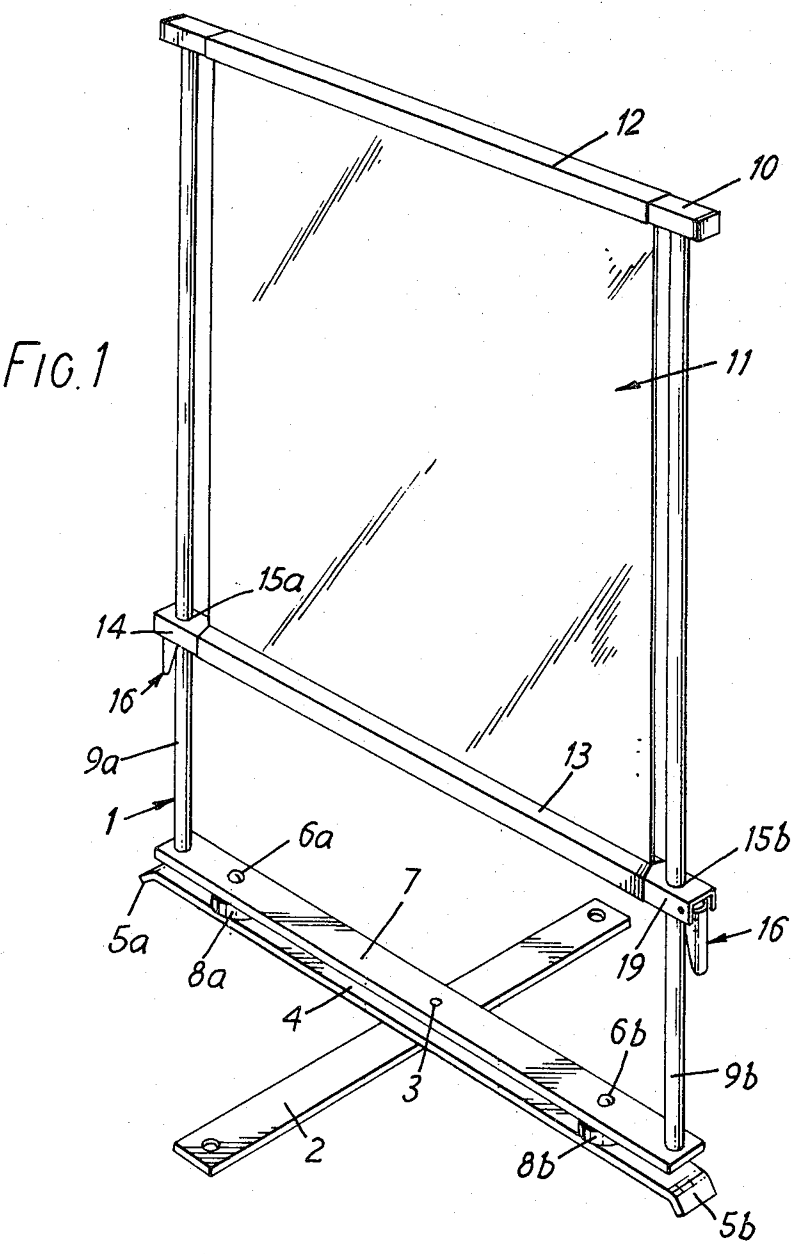
FIG. 1 is a perspective view of a display stand incorporating the device of the present invention.

The display stand shown in FIG. 1 comprises a stand denoted by the general reference numeral 1. This stand includes a first flat iron bar 2 which is pivotally connected by a rivet 3 or a similar means to a second flat iron bar 4, which second flat iron bar has the ends thereof bent to form downwardly direction portions **5*a*, 5*b* which are so dimensioned that the ends thereof will be located in substantially the same horizontal plane as the lower face of the flat iron bar 2. The second flat iron bar 4 is connected by means of rivets 6*a*, 6*b* provided adjacent the ends thereof to a third flat iron bar 7 by means of rubber blocks 8*a*, 8*b*. Two upwardly directed tubes 9*a*, 9*b* are attached to the flat iron bar 7 and the upper ends thereof are designed so as to be inserted into corresponding openings in the lower face of an upper tube 10 parallel to the flat iron bar 7, which tube 10 preferably has a square cross-section. One end of a transparent plastic pocket generally designated by reference numeral 11 is attached to said upper tube 10. For that purpose, the plastic pocket preferably has a sleeve 12 at the upper end thereof, which surrounds the tube 10. In a corresponding manner, the plastic pocket has a lower sleeve 13, surrounding a lower tube 14, which, similarly to the upper tube 10, preferably has a square cross-section. The tube 14 has through holes 15*a*, 15*b* in order to displaceably guide the lower tube along the vertical tubes 9*a*, 9*b*. The lower wall of tube 14 is removed at the ends of tube 14 so that said tube has an U-shaped section at said ends, and a tensioning and attachment device is inserted between the opposed legs of this reversed U, and said device has the general reference numeral 16**.

Figure 2:
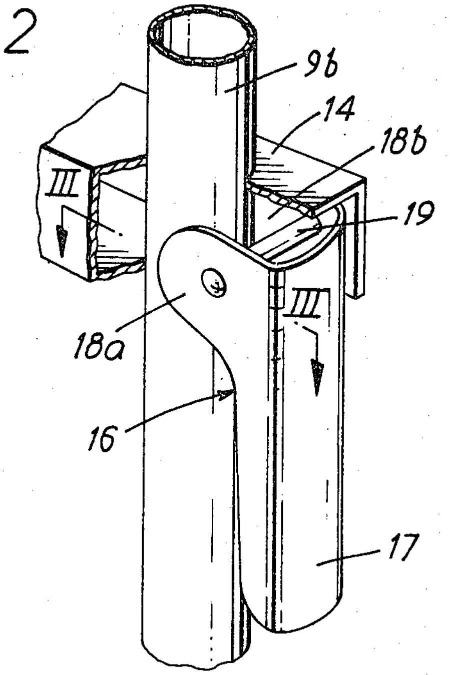
FIG. 2 is a perspective and partially cut away view of the tensioning and attachment device.
Figure 3:
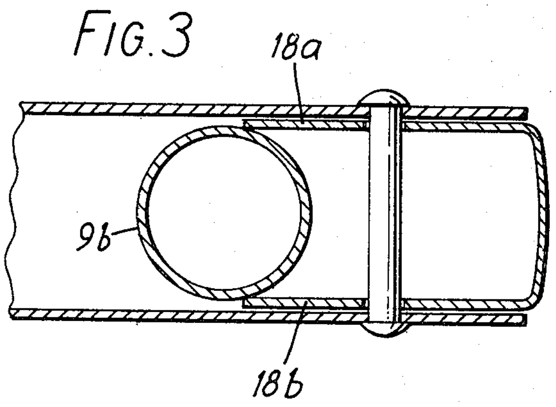
FIG. 3 is a section taken along line III—III of FIG. 1.

As may be seen in FIG. 2 this device comprises a handle portion 17 having a substantially U-shaped section, and two tongues **18*a*, 18*b* which project from said handle portion at an angle and which are journalled by means of a shaft 19 to the legs of the lower tube 14 mentioned above. The distance between the journalling shaft 19 and the corresponding vertical tube 9*a*, 9*b*, respectively, is so selected in relation to the extension of the lugs 18*a*, 18*b* perpendicular to the handle portion 17, that a swinging movement of the handle portion from a position in which the handle portion is substantially located in alignment with the lower tube 14, will result that said lugs, having been in said starting position at least for a major part out of contact with the vertical tubes 9*a*, 9*b* respectively, will come into a successively stronger grip with said tubes 9*a*, 9*b***.

As the lugs **18*a*, 18*b* are so shaped and dimensioned that, in the end position of the handle portion seen in FIG. 2 and under frictional force and after some resilient deformation of the lugs, they engage said tubes 9*a*, 9*b*, the lower tube in said position of the tensioning and attachment device will be fixed or secured against displacement in relation to the tubes 9*a*, 9*b*. During the swinging movement of the handle portion 17 in a clockwise direction towards the end position shown in FIG. 2, the lugs achieve a successively stronger grip with the respective tube 9*a*, 9*b*** and this frictional grip results in the lower tube being downwardly displaced during the tensioning movement. Naturally, the plastic pocket is thereby stretched.

Thus, the tensioning and attachment device described will, upon actuation, bring about a displacement movement of the lower tube 14 in a direction perpendicularly to the plane thereof, and will also provide a locking of the tube 14 in relation to the two vertical tubes **9*a*, 9*b***.

Combined with a display stand, the improved device permits a desired sign to be easily mounted in the pocket 11 when the latter is in the non-stretched position, i.e. when the two tension arms 16 are outwardly folded. In said position, the lower tube 14 is thus freely displaceable along the vertical tubes **9*a*, 9*b*. When the sign is applied in the pocket, it is only necessary to bring the lower tube down manually as far as possible without using a strong force. When the two handles 17** are thereafter turned downwardly, the desired tensioning and locking will be obtained in a single operation and the plastic material will be continuously held well stretched without the need for using springs or similar means.

It will be understood that the display stand is also very easily demounted, and in the demounted condition having the flat iron bars folded against each other, it will occupy a very small space, which means that it is possible to carry a large number of such display stands in for example the luggage space of an ordinary car.

By the efficient damping action obtained by the use of rubber blocks 8*a*, 8*b* rather than springs, the display stand may be subjected to winds which are considerably stronger than those which can be withstood by hitherto known conventional display stands, without tilting or losing the character of a display stand.

In order to obtain a more secure grip between the lugs 18*a*, 18*b* and the respective tube 9*a*, 9*b* the lugs and/or the tubes may be grooved or provided with teeth or cogs.

I claim:

1. A tensioning and attachment device, to co-operate with a tube or a bar having a substantially circular section, comprising a bracket carried displaceably on the tube or the bar, and a tensioning arm pivotally mounted to said bracket, said arm including a handle portion and an abutment portion, said abutment portion having two laterally spaced legs at a spacing which substantially corresponds to the diameter of the tube or bar the pivotal journalling point of the arm on the bracket being selected such that said legs, upon swinging of the tensioning arm from an idle to an operative position, engage the outer surface of the tube or bar with a successively increasing force and said swinging movement, due to a grip obtained between the abutment portion and the tube, causing displacement of the bracket along the tube or the bar and resulting in an increasingly stronger grip between the tensioning arm and the bar or tube.

2. A tensioning and attachment device, according to claim 1, wherein said bracket comprises a tube having a recess in at least one end thereof, into which recess said tensioning arm is inserted.

3. A tensioning and attachment device, according to claim 1, wherein at least the abutment surfaces are provided with cogs or teeth.

* * * * *